Feb. 8, 1944.     F. L. FULKE     2,340,873
ADJUSTABLE JOINT CHAIN
Filed Nov. 25, 1940     2 Sheets-Sheet 1

INVENTOR.
Frank L. Fulke,
BY
Hood & Hahn
ATTORNEYS

Feb. 8, 1944. F. L. FULKE 2,340,873
ADJUSTABLE JOINT CHAIN
Filed Nov. 25, 1940  2 Sheets-Sheet 2

INVENTOR.
Frank L. Fulke,
BY
ATTORNEYS

Patented Feb. 8, 1944

2,340,873

UNITED STATES PATENT OFFICE 2,340,873

ADJUSTABLE JOINT CHAIN

Frank L. Fulke, Terre Haute, Ind., assignor to Frank Prox Company, Inc., Terre Haute, Ind., a corporation of Indiana Application November 25, 1940, Serial No. 367,019

16 Claims. (Cl. 74—251)

This invention relates to chains of the type adapted to be drivingly associated with sprockets, and more particularly to improvements in cutter chains articulated for traveling about a closed orbit in the guideway of a coal cutting machine.

The objects of the invention are to provide an improved chain of the above general type, and the improvements hereinafter described may advantageously be applied to such chains intended for any such purpose, and in which wear may occur in the chain joints. A prime object of the invention is to provide an improvement in service life obtainable with the chain by means of an element permitting adjustment of the chain at its joints, and other objectives will become apparent from the following description:

In the accompanying drawings—

Figure 1:
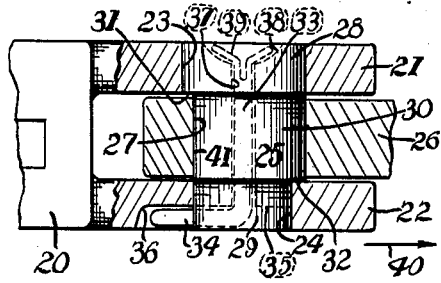
Fig. 1 is a fragmental sectional view through my preferred form of joint for such a chain.

In usual chains there are, at each bending joint, two engaged elements and both these elements wear and thereby cause the chain to stretch out of pitch with a propelling sprocket. I have not been satisfied with conventional methods of eliminating this stretch by replacement of both the worn elements, or eliminating half the stretch by replacing one of the two elements, or eliminating half the stretch by turning one of the two worn elements around through 180° to present a fresh wearing surface. Therefore I have devised in my present improvement means whereby turning one of the two wearing elements through 180° will present a fresh wearing surface eliminating not only the slack occasioned by the wear of that element, but also the slack occasioned by the wear of the other element engaged with it. In other words, I provide in a convenient manner for the complete removal of the total stretch accumulating in the chain through the combined wear occurring on both joint elements, by simply turning one of the two elements through 180° about its longitudinal axis and relocking it, and it will be noted hereafter that I provide means whereby this may be accomplished without the replacement of a single part and without even necessitating the removal of the chain from the mining machine guides. Some forms of my invention are so constructed that it is even unnecessary to disconnect a single joint of the chain in order to effect this adjustment.

These considerations I believe to be of very great importance, as the replacement parts usually required for taking slack out of a cutter chain, plus the laborious procedure of removing the chain from the mining machine and taking all its joints apart and putting them back together runs to such a heavy expense that it is often considered better practise to abstain from this and simply throw the old chain away and purchase a new one after it has stretched about eight inches in length.

A preferred form of my invention is shown in Figs. 1-4 in which a bit block 20 of generally conventional form is provided at its opposite ends with extended spaced arms 21 and 22. These arms are pierced as at 23 and 24 for the reception of a journalling pin 25. A connecting link 26 having a journal opening 27 journals upon pin 25. Pin 25 is formed with an upper end portion 28, a lower end portion 29 concentric therewith but smaller, and a central cylindrical portion 30 of a diameter greater than end portion 29 but less than end portion 28, and it will be observed that upper arm opening 23 is large enough to receive end 28 of pin 25 but that lower arm opening 24 will admit only end 29 of pin 25; and that opening 27 of connecting link 26 will admit end 29 and central portion 30 of pin 25 but not end 28.

The cylindrical middle portion 30 of pin 25 is formed with an axis offset from and parallel with the longitudinal axis of the pin, and, in certain forms of chains, I believe that the degree of this offset should be 3/64".

Shoulders 31 and 32 formed on my journal pin 25 will prevent any displacement downward, toward which the force of gravity would contribute. Therefore I need only secure pin 25 against any upward displacement against the force of gravity, and against rotation. These objectives I secure by an L-shaped cotter pin 33 having a short leg 34 lying in a groove 35 milled across the lower end 29 of pin 25, and projecting outwardly into a recess 36 formed in the lower side of lower arm 22 adjacent to its opening 24. The body portion of this cotter pin lies in a passage 37 formed longitudinally of journal pin 25, and this passage terminates at its upper end in a countersink 38 to provide for expansion therein of the split upper end 39 of the cotter pin. In this manner, journal pin 25 is locked against vertical displacement and against rotation with respect to the block 20, and cotter pin 33 is locked against any displacement.

In use, the chain will be pulled, by its cooperating sprocket, in the direction indicated by arrow 40. Thus wear will arise in the area indicated by the reference numeral 41; and it has been learned, in practice, that that wear occurs in substantially equal degrees on the pin 25 and on the cooperating surface of the opening 27 in the link 26.

When, through wear, each of the cooperating surfaces in the region 41 has been reduced by approximately 3/64", it will be apparent that chain length has been increased at each journal point by approximately 3/32"; and that, since there are two journal points for each block, the total elongation in a 40-block chain will be approximately 7½".

To bring the chain back to its original effective length, the chain is measured in tightly stretched condition. If the chain has been elongated by approximately 7½", I may easily restore it to its original factory pitch as follows: first loosen the cutterbar tension screw as is familiar to all versed in the art, next remove the cutterhead to expose a portion of the chain, next with pliers or a punch, force together the expanded upper end 39 of the cotter pin 33 and drive it downward about ½" which will disengage its lower short leg 34 from groove 35 and from recess 36, so that the journal pin 25 may be rotated 180°. Then the cotter pin 33 is driven up to reengage its leg portion 34 in the groove 35 and recess 36, and its split end 39 is then expanded. This completes the operation at this joint, and the same procedure is followed for each successive joint in the chain.

Figure 2:
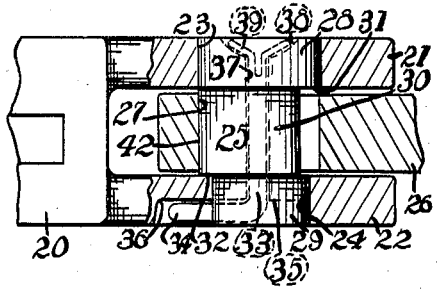
Fig. 2 is a section similar to Fig. 1, but showing the journal element rotated through 180° from its position in Fig. 1, after the joint has become worn.
Figure 3:
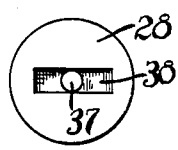
Fig. 3 is an elevation of one end of the journal element of Figs. 1 and 2.
Figure 4:
Fig. 4 is an elevation of the other end thereof.

The above-described operation brings the joint elements into the relation shown in Fig. 2. The unworn surface 42 of the pin 25 is thus positioned 3/64" farther to the left of the axis of the openings 23 and 24 than was the original wearing surface of the pin upon original installation, so that the above-described rotation of the pin has compensated not only for 3/64" of wear on the pin, but also for 3/64" wear on the inner surface of the link opening 27, so that the position of the link 26 with relation to the block 20 has been completely restored.

Figure 5:
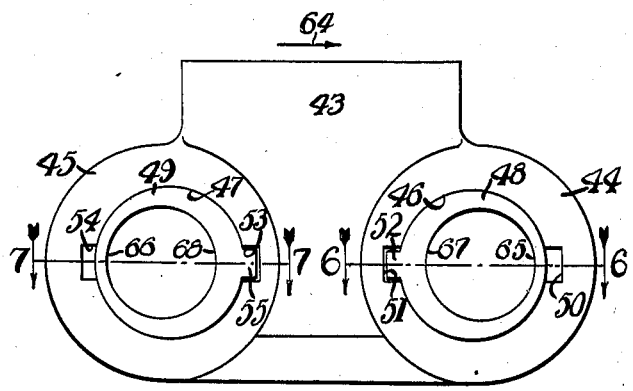
Fig. 5 is an elevation of a conventional chain block of the type including side links alternating with and connecting the blocks, and showing another form of joint falling within the scope of my invention.
Figure 7:
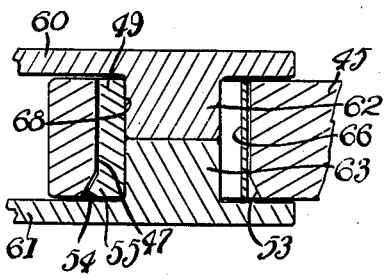
Fig. 7 is a similar fragmental section taken substantially on the line 7—7 of Fig. 5, but showing the bushing 180° removed from its position in Fig. 5.
Figure 6:
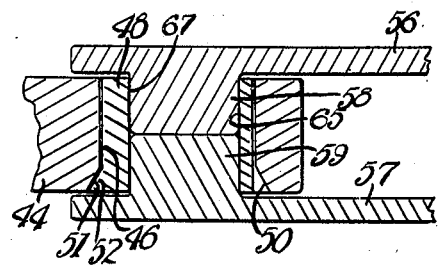
Fig. 6 is a fragmental sectional view taken substantially on the line 6—6 of Fig. 5.
Figure 8:
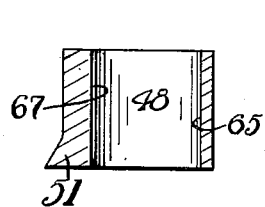
Fig. 8 is a diametrical section through one of the bushings of Fig. 5.

In Figs. 5, 6, and 7, I have shown another conventional type of cutter chain block 43. At its opposite ends, this block is formed with ears 44 and 45; and these ears are perforated, as at 46 and 47. In standard practice, the center distance between these perforations is 3½"; but in accordance with my invention, I space them somewhat closer together, for instance 3 13/32" between centers. Then in the perforation 46 I position an eccentric bushing 48, and in the perforation 47, I position a similar eccentric bushing 49. The eccentricity of each bushing is, in the illustrated embodiment of my invention, 3/64", and the two bushings are oppositely set in the perforations, so that the distance between the axes of the bushing bores is the standard 3½".

The perforation 46 is provided with two diametrically opposite notches 50 and 51 and the bushing 48 is formed with a foot or projection 52 adapted to be seated alternatively in said notches to lock the bushing against rotary movement relative to the chain block. Similarly, the perforation 47 is formed with notches 53 and 54 with which the foot 55 on bushing 49 may similarly cooperate.

A pair of links 56 and 57 provide cooperating studs 58 and 59 which are received in the bushing 48 to connect the block 43 with the next adjacent chain block on the right; and a similar pair of links 60 and 61 provide cooperating studs 62 and 63 which are received in the bushing 49 to connect the block 43 with the next adjacent chain block on the left.

Thus, when the assembly of Fig. 5 is being pulled in the direction indicated by the arrow 64, the studs 58 and 59 will bear upon and wear against the surface 65 of the bushing 48, while the studs 62 and 63 will bear upon and wear against the surface 66 of the bushing 49.

Take-up to compensate for wear is, of course, effected by shifting the bushings 48 and 49 axially a sufficient distance to disengage the feet 52 and 55 from the notches 51 and 53, respectively, and rotating them through 180°, and then reshifting them to engage the feet in the notches 50 and 54, respectively.

This adjustment positions the surface 67 of the bushing 48 to take the wear from studs 58 and 59, and positions the surface 68 of bushing 49 to take the wear from studs 62 and 63 (as in Fig. 7). Thus, the adjustment compensates for wear not only on the surfaces 65 and 66 of the bushings but also for the substantially equal wear on the studs 58 and 59 and the studs 62 and 63.

Figure 9:
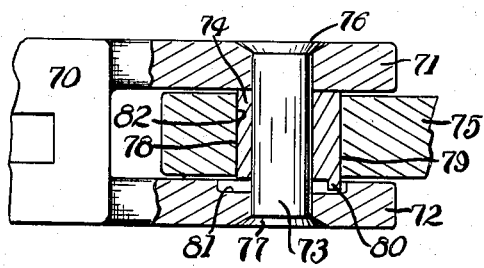
Fig. 9 is a fragmental section through an end of a cutter chain block of another type.

In the organization of Fig. 9, chain block 70 is provided with spaced side arms 71 and 72 pierced to receive a pin 73 upon which is sleeved a bushing 74. A connecting link 75 has one end positioned between side arms 71 and 72 and journalled on bushing 74. The pin 73 is secured in place by riveting its ends over as at 76 and 77. The bushing 74 is formed with two optionally usable wearing surfaces 78 for first wear and 79 for second wear and these surfaces when positioned for use are offset unequal distances from the center of the bushing bore. A lug 80 formed on one end of the bushing 74 takes into a recessed groove 81 formed upon the inner wall of side arm 72 for the purpose of locking the bushing against rotation relative to the block 70, thereby constituting the pin 73 and the bushing 74 an operative unit. It will now be seen that when wearing surface 78 of the bushing becomes worn and wearing surface 82 of the connecting link 75 becomes likewise worn, then I may position new wearing surface 79 of bushing 74 for second wear, whereby the sum of the wear on bushing 74 and the wear on connecting link 75 is compensated.

Figure 10:
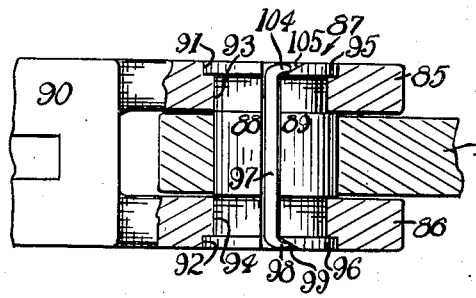
Fig. 10 is a fragmental sectional view of an end of a block similar to that of Fig. 5, and showing still another form of joint.
Figure 11:
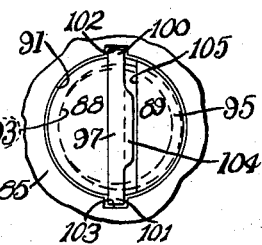
Fig. 11 is an end view of the journal means of Fig. 10.

In Fig. 10 I illustrate a preferred embodiment of my invention to meet a condition where a prime requirement exists that the side arms 85 and 86 of the chain block must be prevented from spreading apart as might be the case when very hard impurities are engaged by the cutter chain bits, which tends to throw excessive lateral stresses on the chain joints. In this construction I form my journal pin 87 for insertion in two separate pieces 88 and 89, one at a time. The bit block 90 is similar to that in Figs. 1 and 2, but has counterbored enlargements 91 and 92 formed at the outside of its journal pin receiving openings 93 and 94. The journal pin 87, as illustrated also in Fig. 11, is formed with end collars 95 and 96 of greater diameter than any other portion of the pin and of greater diameter than the pin receiving openings 93 and 94. The central portion of pin 87 is formed similarly to pin 25 in Figs. 1 and 2, being cylindrical about an axis offset from, and parallel with, the axis of the ends by which it is attached to the link. Obviously this pin could not be inserted in one piece, and as obviously it must have collars 95 and 96 larger than the openings 93 and 94 in order to hold the side arms against spreading.

I therefore propose to make pin 87 as one piece, and then, with a ⅛" thickness abrasive saw, I will remove longitudinally from the middle a slice of its body section and obtain the two separate pieces 88 and 89, either of which I may then insert into position, and then insert the other, by reason of this body space removed centrally from the pin. After the two pieces are inserted in position a spacer 97 of approximately ⅛" thickness is then inserted between pieces 88 and 89. At its lower end, spacer 97 is expanded as at 98 to conform to bevel 99 provided on the pin. It is also expanded at its upper end, as at 100, 101 to extend into notches 102 and 103 formed in the adjacent side arm 85, and as at 104 to expand into bevel 105 on the pin, thereby securing the journal pin against rotation with respect to the block 90, and securing the spacer 97 against any dislodgment. Obviously, and similarly to the foregoing description applying to the structure shown in Figs. 1 and 2, when wear occurs, the spacer 97 may be engaged with a chisel tool to disengage its portions 100 and 101 from the notches 102 and 103 and the pin 87 may then be turned through 180 degrees to compensate for all the wear, without removing or disconnecting any parts; after which spacer 97 may be relocked. The two piece pin 87 is of course hardened as are the side arms 85 and 86 of bit block 90, so that any distortion of either of these elements, or any spreading apart of side arms 85 and 86 through the excessive side strains is prohibited by this construction.

Of course, a link 106 is journal mounted on the eccentric portion of the pin 87.

In the foregoing description of my improvement I have pointed out three specific variations in its application as follows; in the structure shown in Figs. 5, 6, 7, and 8, it is an eccentrically formed bushing having two wearing surfaces formed on its inner wall optionally available for successive use in two wearing positions. In the structure shown in Fig. 9 I show a bushing likewise eccentrically formed but having its two optional wearing surfaces formed on its outer wall. In Figs. 1, 2, 3, 4, 10, and 11, I show a journal pin likewise eccentrically formed and having two optionally usable wearing surfaces. In these three variations I have referred in each case to rotating the joint element through 180° to position it for second wear, but this is not the only way in which I may obtain the desired adjustment. To explain, consider the fact that block 43 in Fig. 5 is formed with a pair of opposite ends each provided with an opening, my eccentric bushings being fitted therein in position for first wear. When that wear has occurred, I may, instead of turning the bushings through 180°, reverse the positions of the bushings without rotating them, placing the bushing 48 in opening 47 and placing the bushing 49 in opening 46. This will of course bring fresh wearing surfaces into wearing position. This could likewise be done with the bushing shown in Fig. 9 and with the journal pins shown in Figs. 1 to 4 and 10 and 11, and I do not wish to be limited in the scope of my invention to the particular structure or description herein given.

Figure 12:
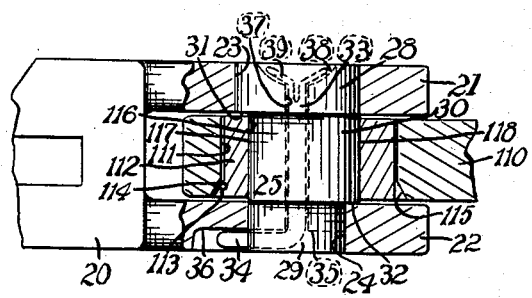
Fig. 12 is a view similar to Fig. 10, but showing still another form of journal means.

In Fig. 12, I have illustrated a structure which will triple the life of a chain instead of merely doubling it. Thus, the device of Fig. 12 combines features of the form of my invention illustrated in Figs. 1 and 2 with features of the form of my invention illustrated in Figs. 5 to 8.

The block of Fig. 12 may be identical with that of Fig. 1, as may the journal pin and cotter pin, and therefore those elements are identically designated.

A connecting link 110 is perforated as at 111 for the reception of an eccentric bushing 112 similar to the bushing 48 or 49. Said bushing is provided with a foot 113 alternatively receivable in either of two notches 114 and 115 opening from the perforation 111 to lock the bushing against rotation relative to the link 110.

From the above, it will be obvious that, when wear has taken place between the surface 116 of the bushing 112 and the contacting surface 117 of the portion 30 of pin 25, that wear may be taken up in the manner described in connection with Figs. 1 and 2, by rotating the pin 25 through 180° to bring its surface 118 into contact with the worn surface 116 of the bushing. Now, when the chain again expands through wear of pin surface 118 and further wear of bushing surface 116, the bushing may be rotated through 180°, as described in connection with Figs. 5 to 7, thereby again compensating for the wear and giving the chain a third effective life span, without requiring the replacement of any parts.

I claim as my invention:

1. As an article of manufacture, a journal pin for a chain, said pin being formed with concentric cylindrical end portions of unequal diameters, and the intermediate portion of said pin being cylindrical, having a diameter intermediate the diameters of said end portions, and having its axis offset from but parallel with the common axis of said end portions.

2. As an article of manufacture, an L-shaped retaining pin formed with the end of one of its legs slotted in cotter pin manner.

3. In a chain, a link having relatively immovable spaced arms pierced by aligned apertures of unequal diameters, a journal unit having opposite end portions of unequal diameters respectively received in said apertures, an adjacent connecting link fitted between said spaced arms and having an opening journalled upon said unit, the portion of said unit disposed between said arms being formed cylindrically about an axis offset from the common axis of said ends, and shiftable relative to the common axis of said aligned apertures.

4. A chain link formed at one end with relatively immovable spaced arms pierced to support a journal pin, and an adjacent link journaled upon said pin, and said pin being formed with a cylindrical journal surface upon which said last-named link is journaled, and the axis of which is parallel with but offset laterally in the plane of chain travel from the axis of the portions of said pin engaged by said first-named link, at least one end portion of said pin engaged by said first-named link having a diameter greater than the diameter of said cylindrical journal surface.

5. In a chain comprising links each having spaced apart arms holding a journal pin adapted to receive thereon the journaling action of a connecting link disposed between said arms, said journal pin having an upper larger end and a lower smaller end, a passage extending longitudinally of the body of said pin and a cross groove formed at the lower end of said pin at right angles to said passage, and an L-shaped retaining pin having a leg lying in said cross groove and projecting past it to hook below the lower of said arms, and having a leg lying in said passage and terminating in an end deformable above said upper end of said journal pin, whereby said journal pin is locked against vertical displacement and against rotation and said retaining pin is locked against displacement.

6. In a chain a link having spaced apertured arms, the aperture in the lower arm being smaller than the aperture in the upper arm, a journal pin sized to fit said apertures and having an intermediate portion eccentric to its ends, and a locking element adjustable to lock or unlock said journal pin against displacement and against rotation, said element being hooked into a recess in one of said arms.

7. In a chain comprising links articulated for traveling about a closed orbit, a link having spaced arms provided with apertures for supporting a journal pin having at its middle portion a bearing surface, an adjacent link formed with a bore sized to journal upon said bearing surface, said pin being formed in two separate pieces with a spacing element between them whereby said bearing surface is cylindrical, collars formed at both ends of said journal pin and said collars sized to be of greater diameter than either the said middle bearing surface or either of the two apertures in said spaced arms.

8. In a chain comprising links articulated for traveling about a closed orbit, a link having spaced apart arms provided with apertures for supporting a journal pin, said journal pin having at its ends collars of greater diameter than said apertures, and having at its middle a journal surface, said journal pin comprising two part-cylindrical pieces, with a spacing element between them.

9. In a chain comprised of links articulated for traveling about a closed orbit, adjustable means at each joint in said chain for varying the pitch of the links and the length of the chain without disconnecting any links or replacing any parts, said means comprising a journal element having two diametrically opposed successively usable wearing surfaces formed at unequal distances from the axis of said journal element, and means independently shiftable with respect to said journal element and said links for releasably holding said journal element against rotary movement with relation to one of its associated links.

10. In a chain, a link having relatively immovable spaced arms holding a journal pin, and an adjacent connecting link fitted between said spaced arms and having an opening therein, an eccentric bushing optionally securable within said opening in either of two positions about its axis to compensate for wear, said pin at its middle being formed cylindrically about an axis offset from the axis of its ends to provide additional means to compensate for wear, and said bushing being journaled on said mid portion of said pin.

11. In a chain, a pair of links, one of said links being formed with a pair of relatively immovable, spaced, apertured arms, an eccentric pin supported in the apertures of said arms, and an eccentric bushing carried by the other of said links, said bushing being journaled on said pin, said pin being shiftable to compensate for the sum of the wear occurring between said pin and said bushing, and said bushing being independently shiftable independently to compensate for the sum of such wear, whereby three successive "wear-outs" of the chain joints may be secured.

12. A chain comprising links articulated for traveling about a closed orbit, male and female elements at each bendable joint having engaged wearing surfaces, each male element being eccentrically formed and supported, in any one of a plurality of positions of rotary adjustment about one of its axes, transversely of and between relatively immovable spaced arms of a link, and each female element being operatively associated with said male element and with an adjacent link, whereby rotation of said male element on its said axis without disturbing the relative positions of said arms draws said adjacent link toward said first-mentioned link.

13. In a chain comprised of links articulated for traveling about a closed orbit, adjustable means at certain joints in said chain for varying the length of the chain without disconnecting any links or replacing any parts, said means comprising a journal element having two diametrically opposed alternatively usable wearing surfaces formed at unequal distances from the axis of said journal element, and an L-shaped retaining pin having one of its legs normally disposed in registering kerfs in said journal element and one of its associated links, and its other leg slotted in cotter pin manner and engaging a surface of said journal element opposed to the kerfed portion thereof.

14. In a chain, a link having vertically spaced horizontally extending apertured arms, the aperture in the lower arm being smaller than the aperture in the upper arm, a journal pin sized to fit said apertures and mounted therein, said pin being formed to define a shoulder bearing against the upper face of said lower arm to limit downward movement of said pin, and being further formed with a recess in an end face, and means engaging in said recess to limit upward movement of said pin and to hold the same against rotation.

15. In a chain comprising links articulated for traveling about a closed orbit, a link having a pair of relatively immovable spaced arms, said arms being formed with aligned apertures, the aperture through one of said arms being smaller than the aperture through the other of said arms, a journal unit having its opposite ends rotatably adjustably mounted in said respective apertures, a second link swivelly mounted on that portion of said journal unit positioned between said arms, said last-mentioned portion of said journal unit being of a diameter intermediate the diameters of said apertures to define a shoulder adjacent said one arm limiting axial movement of said journal unit in one direction, a recess formed in an end surface of said journal unit, and means engaging in said recess and restraining said journal unit against axial movement in the opposite direction, and against rotation about its axis.

16. In a chain, a link having vertically spaced horizontally extending apertured arms, the aperture in the lower arm being smaller than the aperture in the upper arm, a journal pin sized to fit said apertures and mounted therein, said pin being formed to define an annular shoulder adapted to bear downwardly against an upwardly-directed surface to limit downward movement of said pin when the end surface of the larger end of said pin lies substantially flush with the upper surface of the upper one of said arms, and being further formed with a recess in an end face, and means engaging in said recess and engaging one of said arms to limit upward movement of said pin and to hold the same against rotation.

FRANK L. FULKE.